US010202090B2

(12) United States Patent
Arnold et al.

(10) Patent No.: US 10,202,090 B2
(45) Date of Patent: Feb. 12, 2019

(54) CIRCUIT FOR CONTROLLING AN ACCELERATION, BRAKING AND STEERING SYSTEM OF A VEHICLE

(71) Applicant: SCHAEFFLER PARAVAN TECHNOLOGIE GMBH & CO. KG, Herzogenaurach (DE)

(72) Inventors: Roland Arnold, Pfronstetten-Aichelau (DE); Georg Kotrotsios, Mainz (DE)

(73) Assignee: Schaeffler Paravan Technologie GmbH & Co. KG, Herzogenaurach (DE)

( * ) Notice: Subject to any disclaimer, the term of this patent is extended or adjusted under 35 U.S.C. 154(b) by 483 days.

(21) Appl. No.: 14/176,293

(22) Filed: Feb. 10, 2014

(65) Prior Publication Data

US 2014/0229064 A1 Aug. 14, 2014

(30) Foreign Application Priority Data

Feb. 12, 2013 (DE) .................. 10 2013 202 253

(51) Int. Cl.
*B60R 16/023* (2006.01)
*B60W 50/023* (2012.01)
(Continued)

(52) U.S. Cl.
CPC ........ *B60R 16/0231* (2013.01); *B60L 3/0092* (2013.01); *B60W 50/023* (2013.01);
(Continued)

(58) Field of Classification Search
CPC ... B60R 16/0231; B60W 10/18; B60W 10/20; B60W 2050/0006; B60W 2050/0292;
(Continued)

(56) References Cited

U.S. PATENT DOCUMENTS 3,783,250 A * 1/1974 Fletcher ................ G06F 11/187
714/10
4,794,601 A * 12/1988 Kikuchi .................. G06F 11/10
714/758
(Continued)

FOREIGN PATENT DOCUMENTS

| DE | 195 26 250 | 1/1997 |
| DE | 198 29 126 | 5/1999 |
| DE | 10 2006 062 300 | 10/2008 |

OTHER PUBLICATIONS

Christmansson, J. et al., "Dependable Flight Control System by Data Diversity and Self-Checking Components," Microprocessing and Microprogramming, Elsevier Science Publishers, Bv., Amsterdam, NL, vol. 40, No. 2-3, pp. 207-222 (Apr. 1, 1994).*

*Primary Examiner* — Angelina Shudy
(74) *Attorney, Agent, or Firm* — Collard & Roe, P.C.

(57) ABSTRACT

A circuit for controlling an acceleration, braking and steering system of a vehicle having at least two separate motors for actuating the acceleration and braking system, at least two separate motors for actuating the steering system and at least one electronic control unit for controlling the motors. The control unit comprises three identical CPUs and one programmable logic component. Each of the CPUs generates control signals for the motors depending on input control signals and sensor signals of the motors and forwards these control signals to the programmable logic component. The programmable logic component, depending on its programming, forwards the control signals of one of the CPUs to the motors.

9 Claims, 1 Drawing Sheet

(51) Int. Cl.
*B62D 5/04* (2006.01)
*B60L 3/00* (2006.01)
*G06F 11/16* (2006.01)
*B60W 50/00* (2006.01)
*B60W 50/029* (2012.01)

(52) U.S. Cl.
CPC ............. *B62D 5/04* (2013.01); *B62D 5/0493* (2013.01); *G06F 11/1629* (2013.01); *G06F 11/1633* (2013.01); *G06F 11/1641* (2013.01); *B60W 2050/0006* (2013.01); *B60W 2050/0292* (2013.01); *Y02T 10/648* (2013.01)

(58) Field of Classification Search
CPC ...... B60W 50/023; B60L 3/0092; B62D 5/04; B62D 5/0493; G06F 11/1629; G06F 11/1633; G06F 11/1641; Y02T 10/648
USPC ..... 701/41, 43, 97, 102, 107; 700/2, 7, 249; 714/10, 11
See application file for complete search history.

(56) References Cited

U.S. PATENT DOCUMENTS

| | | | | |
|---|---|---|---|---|
| 5,297,052 | A * | 3/1994 | McIntyre | G01C 21/16 33/321 |
| 5,379,415 | A * | 1/1995 | Papenberg | G06F 11/106 714/5.11 |
| 5,666,483 | A * | 9/1997 | McClary | 714/10 |
| 5,812,757 | A * | 9/1998 | Okamoto | G06F 11/1658 714/11 |
| 5,832,395 | A * | 11/1998 | Takeda | B60L 11/1803 701/22 |
| 5,923,830 | A * | 7/1999 | Fuchs | G06F 11/1641 714/11 |
| 6,015,193 | A | 1/2000 | Vogel et al. | |
| 6,173,229 | B1 * | 1/2001 | Fennel et al. | 701/91 |
| 6,263,452 | B1 * | 7/2001 | Jewett | G06F 1/12 714/11 |
| 6,334,194 | B1 * | 12/2001 | Hihara | G06F 11/0724 712/32 |
| 6,367,031 | B1 * | 4/2002 | Yount | G05B 9/03 700/4 |
| 6,628,993 | B1 * | 9/2003 | Bauer | 700/20 |
| 6,687,851 | B1 * | 2/2004 | Somers | G06F 11/1641 714/11 |
| 6,807,477 | B2 * | 10/2004 | Hirata | 701/114 |
| 6,820,213 | B1 * | 11/2004 | Somers | G06F 11/165 714/11 |
| 6,971,043 | B2 * | 11/2005 | McLoughlin | G06F 11/0727 712/10 |
| 7,154,244 | B2 * | 12/2006 | Asaumi et al. | 318/599 |
| 7,191,359 | B2 * | 3/2007 | Shimamura | G05B 9/03 700/2 |
| 7,328,371 | B1 * | 2/2008 | Kalyanasundharam | G06F 11/1641 712/22 |
| 7,676,286 | B2 * | 3/2010 | Disser et al. | 700/82 |
| 7,856,569 | B2 * | 12/2010 | Mueller | G06F 9/30181 712/229 |
| 7,877,627 | B1 * | 1/2011 | Freydel | G06F 11/1633 714/11 |
| 7,890,233 | B2 * | 2/2011 | Yamada | G06F 11/1641 701/107 |
| 8,046,137 | B2 * | 10/2011 | Yamada et al. | 701/45 |
| 8,649,943 | B2 * | 2/2014 | Morath | G05B 9/03 701/30.3 |
| 9,811,429 | B2 * | 11/2017 | Kanekawa | G06F 11/165 |
| 2002/0065986 | A1 * | 5/2002 | Jeffrey | G06F 11/10 711/117 |
| 2002/0073357 | A1 * | 6/2002 | Dhong | G06F 9/3861 714/19 |
| 2002/0152419 | A1 * | 10/2002 | McLoughlin | G06F 11/0727 714/11 |
| 2002/0152420 | A1 * | 10/2002 | Chaudhry | G06F 11/1641 714/11 |
| 2003/0115500 | A1 * | 6/2003 | Akrout | G06F 11/2043 714/10 |
| 2003/0188221 | A1 * | 10/2003 | Rasmussen | G05B 9/03 714/11 |
| 2004/0186979 | A1 * | 9/2004 | Janke | G06F 9/30189 712/1 |
| 2005/0228546 | A1 * | 10/2005 | Naik | B60T 8/885 701/1 |
| 2005/0278107 | A1 * | 12/2005 | Disser | B60T 8/1755 701/76 |
| 2005/0278567 | A1 * | 12/2005 | Wolfe | G06F 11/184 714/11 |
| 2006/0150003 | A1 * | 7/2006 | Abe | G06F 11/2005 714/11 |
| 2006/0200278 | A1 * | 9/2006 | Feintuch | G05B 9/03 701/3 |
| 2006/0236168 | A1 * | 10/2006 | Wolfe | G06F 11/1641 714/724 |
| 2007/0250183 | A1 * | 10/2007 | Howell et al. | 700/20 |
| 2007/0294602 | A1 * | 12/2007 | Miller | G06F 11/1691 714/55 |
| 2008/0091927 | A1 * | 4/2008 | Mueller | G06F 9/30021 712/229 |
| 2008/0147247 | A1 * | 6/2008 | Weldin | 701/1 |
| 2008/0209170 | A1 * | 8/2008 | Mueller | G06F 9/30021 712/43 |
| 2008/0270746 | A1 * | 10/2008 | Mueller | G06F 11/1641 712/20 |
| 2008/0320287 | A1 * | 12/2008 | Von Collani | G06F 9/30181 712/229 |
| 2008/0320340 | A1 * | 12/2008 | Weiberle | G06F 9/30181 714/48 |
| 2009/0055674 | A1 * | 2/2009 | Mueller | G06F 9/30181 713/375 |
| 2010/0004841 | A1 * | 1/2010 | Mueller et al. | 701/101 |
| 2012/0210198 | A1 * | 8/2012 | Gale et al. | 714/807 |
| 2013/0024721 | A1 * | 1/2013 | Kabulepa | G06F 11/1641 714/5.1 |
| 2013/0060526 | A1 * | 3/2013 | Geiger | G06F 11/1641 702/186 |
| 2013/0066523 | A1 * | 3/2013 | Iwamoto | B62D 5/0493 701/41 |
| 2014/0108896 | A1 * | 4/2014 | Jung | B60W 50/0205 714/819 |
| 2014/0114557 | A1 * | 4/2014 | Nutaro et al. | 701/121 |
| 2014/0344619 | A1 * | 11/2014 | Kwon | G06F 11/1641 714/11 |
| 2015/0095699 | A1 * | 4/2015 | Shirano | G06F 11/1641 714/12 |
| 2015/0339201 | A1 * | 11/2015 | Kanekawa | G06F 11/165 714/6.11 |
| 2016/0347326 | A1 * | 12/2016 | Iwagami | B60W 10/06 |
| 2018/0105183 | A1 * | 4/2018 | Kollmer | B60W 50/0205 |
| 2018/0267866 | A1 * | 9/2018 | Venu | G06F 11/1641 |
| 2018/0267867 | A1 * | 9/2018 | Bose | G06F 11/1658 |
| 2018/0267868 | A1 * | 9/2018 | Bose | G06F 11/1658 |

* cited by examiner

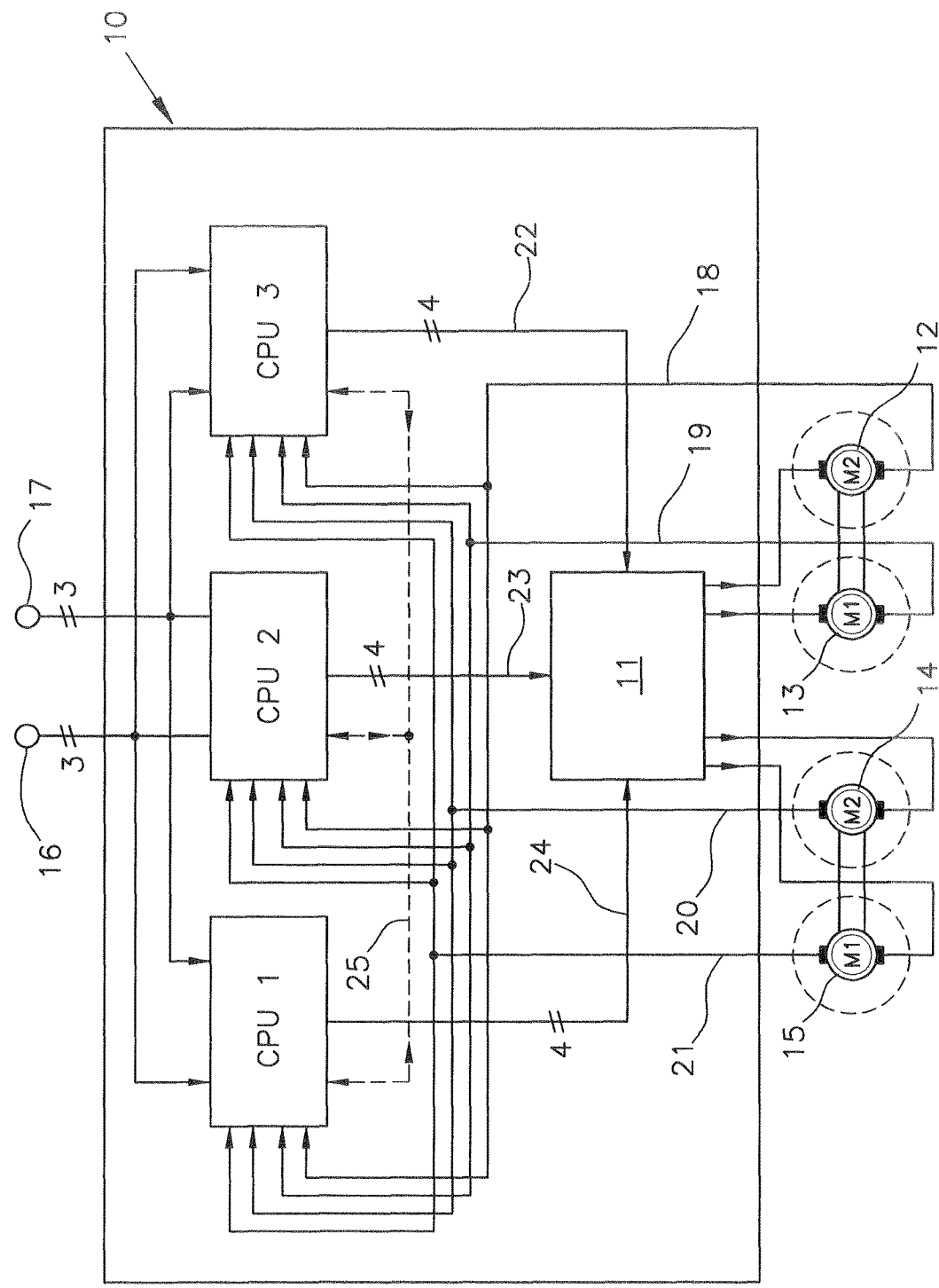

CIRCUIT FOR CONTROLLING AN ACCELERATION, BRAKING AND STEERING SYSTEM OF A VEHICLE

CROSS-REFERENCE TO A RELATED APPLICATION

The invention described and claimed hereinbelow is also described in German Priority Document DE 10 2013 202253.0, filed on Feb. 12, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a circuit for controlling an acceleration, braking, and steering system of a vehicle having at least two separate motors for actuating the acceleration and braking system, at least two separate motors for actuating the steering system and at least one electronic control unit for controlling the at least two separate motors for actuating the acceleration and braking system and the at least two separate motors for actuating the steering system.

A circuit that relates to the invention is described in DE 10 2006 062 300 B4 and comprises two control units, namely one for the braking and acceleration system and one for the steering system. Each of the control units has two identical, redundant CPUs. Only one of the CPUs is active during operation. If a malfunction of the currently active CPU is ascertained by a security processor, a switchover to the other CPU is implemented, which other CPU then handles the control from that point forward.

Such known control has a high security level due to the presence of redundant CPUs and redundant security processors in the control units. Redundancy is present not only in the motors, but also in the control of the braking and acceleration system and the steering system of the vehicle.

SUMMARY OF THE INVENTION

The present invention overcomes the shortcomings of known arts, such as those mentioned above.

To that end, the present invention provides a circuit that is similar in some respects to the circuit described in DE 10 2006 062 300 B4 but with fewer components and such that the inventive circuit still has a high security level.

In an embodiment, the invention provides a circuit for controlling an acceleration, braking, and steering system of a vehicle having at least two separate motors for actuating the acceleration and braking system, at least two separate motors for actuating the steering system and at least one electronic control unit for controlling the at least two separate motors for actuating the acceleration and braking system and the at least two separate motors for actuating the steering system. The inventive circuit is characterized in that the at least one control unit comprises three identical CPUs and one programmable logic component, wherein each of the CPUs generates control signals for the motors depending on input control signals and sensor signals of the motors and forwards these control signals to the programmable logic component, which, depending on the programming thereof, forwards the control signals of one of the CPUs to the motors.

The circuit according to the invention therefore functions with only three CPUs and one logic component, while known circuitry (i.e., the circuit of DE 10 2006 062 300 B4) comprises four CPUs, two of which are security processors. As a result, the number of components is markedly reduced compared to known circuitry. Since all three CPUs operate at all times in the inventive circuit and, compare their control results with one another, or this comparison is performed in the logic component, the required security is ensured nonetheless. Even in the event that one of the CPUs fails, two additional redundant systems are still available to control the braking and acceleration system and the steering system.

The programmable logic component is preferably a complex programmable logic device (CPLD). These logic device components are more favorable and substantially more robust than security processors in view of the fact that they contain a logic matrix for linking input signals according to programmable rules.

The input control signals for the CPUs are generated by control elements of the braking and acceleration system and the steering system, which are preferably disposed in the vehicle. These control elements can be joysticks, steering elements, and/or pedals, for example. A remote control of the braking and acceleration system and the steering system from outside the vehicle is also feasible.

In addition to the input signals originating from the control elements and the motors, the CPUs also process sensor signals from the motors, which depict the operating state thereof. In particular, the sensor signals are generated by current measuring devices and/or temperature sensors on each of the motors. By measuring current and temperature, it is possible to reliably ascertain faulty operating states of the motors and, in particular, short circuits of the coils.

In addition to direct signals from the CPUs, the logic component receives, via further lines, results of comparisons of the signals from the two adjacent CPUs, and use theses, in addition to the data received directly, to check for correct functioning of the CPUs. Furthermore, the output signals of the CPUs are fed back to the input thereof.

H-bridge circuits of the motors are preferably controlled by control signals of one of the CPUs that have been forwarded by the logic component. These circuits are used to control the direction of rotation and the acceleration and the braking of the motors using relatively simple circuitry. The switches in the H bridges are usually embodied as transistors. Relays can therefore be eliminated.

As is the case with the known system, the at least two separate motors of the braking and acceleration system and the at least two separate motors of the steering system can drive a common shaft in each case. The circuit according to the invention may therefore be retrofitted in a relatively simple manner on existing vehicles without redundancy.

The invention also relates to a method for controlling an acceleration and braking system and a steering system of a vehicle having at least two separate motors for actuating the acceleration and braking system, at least two separate motors for actuating the steering system, in which input control signals of control elements in or on the vehicle for the acceleration and braking system are received by at least one electronic control unit having three CPUs and one programmable logic component. In the method, these input control signals are evaluated by the three CPUs, wherein each of the CPUs generates control signals for the motors on the basis of the input control signals and sensor signals of the motors and wherein the control signals of the CPUs are compared to one another and the logic component switches the control signals of one of the CPUs to the motors depending on the programming of this logic component.

Preferably, the logic component is programmed such that the logic component forwards the control signals of the CPU that appears to be the most trustworthy on the basis of the comparison of the control signals of this CPU with the control signals that are generated by the two other CPUs. If one CPU appears to be defective, this CPU can no longer be taken into account by the logic component in the further evaluation. The control is then performed by the two remaining, faultlessly functioning CPUs, which are still redundant. If the logic component ascertains a malfunction of one of the CPUs, a related error message is output to a display device, for example, in the vehicle.

BRIEF DESCRIPTION OF THE DRAWINGS

Further features and advantages of the invention will become apparent from the description of embodiments that follows, with reference to the attached figures, wherein:

FIG. 1 presents a circuit according to one embodiment of the invention.

DETAILED DESCRIPTION OF THE INVENTION

The following is a detailed description of at least one example embodiment of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The invention is described in greater detail in the following by reference to a the circuit of FIG. 1, which shows a control unit 10 and motors 12, 13 for the braking and acceleration system, and motors 14, 15 for the steering of a non-illustrated vehicle.

The control unit 10 comprises three CPUs, namely CPU1, CPU2, CPU3. The three CPUs, namely CPU1, CPU2, CPU3, are identically designed and perform identical tasks. Each of these CPUs receive, via a first input 16, three redundant input signals from non-illustrated control elements such as joysticks, steering wheels, or pedals for the steering and the braking and acceleration system of the vehicle and, via a second input 17, three redundant input signals of position sensors on the motors.

Furthermore, the three CPUs, namely CPU1, CPU2, CPU3, receive further sensor signals from the motors 12, 13, 14 and 15 via lines 18, 19, 20, 21. These sensor signals contain information on the operating state of the motors and, on the current flow through the motors and the temperature thereof. On the basis of the input control signals 16, 17 and the sensor signals of the lines 18 to 21, the three CPUs, namely CPU1, CPU2, CPU3, each calculate output signals for the motors 12, 13, 14 and 15 and transmit these output signals via lines 22, 23, 24 to a programmable logic component 11. The programmable logic component 11 selects, depending on the programming thereof and, depending on the input signals it receives from the three CPUs (CPU1, CPU2, CPU3), one of the three CPUs and forwards the signals thereof to the four motors 12, 13, 14 and 15. The three CPUs (CPU1, CPU2, CPU3) are connected to one another via a line 25, which is shown as a dashed line.

The signals received from the adjacent CPUs are compared to the signals of the receiving CPU. The result of the comparison is transmitted via the lines 22 to 24 to the logic component 11 and is taken into consideration in the selection of the CPU, the signals of which are forwarded to the motors 12 to 15. The logic component 11 is advantageously programmed such that a CPU selected at one time controls the motors 2, 13, 14 and 15 until the two adjacent CPUs deliver output signals that differ from those of the currently selected CPU. In this case, it is assumed that the previously selected CPU no longer functions properly and the logic component 11 selects a different CPU for the further control of the motors 12, 13, 14 and 15.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A circuit for controlling acceleration, braking and steering of a vehicle having at least two separate motors for actuating an acceleration and braking system, at least two separate motors for actuating the steering system and at least one electronic control unit for controlling the at least two separate motors for actuating the acceleration and braking system and the at least two separate motors for actuating the steering system, the at least one control unit comprising three identical CPUs; and
a programmable logic component;
wherein each of the three identical computer processing units (CPUs) generates control signals for the at least two separate acceleration and braking system motors and at least two steering system motors depending on input control signals and on sensor signals of the at least two separate acceleration and braking system motors and the at least two steering system motors, forwards the generated control signals to each other of the three identical CPUs, compares the generated control signals received from the each other of the three identical CPUs with the generated control signals and, forwards the generated control signals and the CPU compare results to the programmable logic component; and
wherein the programmable logic component is programmed to process the generated control signals and the CPU compare results generated by the three identical CPUs, select one of the three identical CPUs determined to be most trustworthy based on the processing and forwards the control signals of the selected CPU to the at least two separate acceleration and braking system motors and the at least two steering system motors thereby ensuring secured control of the acceleration and braking and the steering system.

2. The circuit according to claim 1, wherein the programmable logic component is a complex programmable logic device (CPLD).

3. The circuit according to claim 1, wherein the input control signals are generated by control elements of the acceleration and braking system and the steering system and by the position sensors of the at least two separate acceleration and braking system motors and the at least two steering system motors.

4. The circuit according to claim 3, wherein the control elements are one or more of joysticks, steering wheels, and pedals.

5. The circuit according to claim 1, wherein the sensor signals are generated by current measuring devices, temperature sensors on each of the at least two separate acceleration and braking system motors and the at least two steering system motors.

6. The circuit according to claim 1, wherein H-bridge circuits of the at least two separate acceleration and braking system motors and the at least two steering system motors are controlled by control signals forwarded by the logic component.

7. The circuit according to claim 1, wherein the at least two separate motors of the acceleration and braking system and the at least two separate motors of the steering system drive a common shaft, respectively.

8. A method for controlling an acceleration and braking system and, a steering system of a vehicle having at least two separate motors for actuating the acceleration and braking system, at least two separate motors for actuating the steering system, and at least one electronic control unit having three computer processing units (CPUs) and one programmable logic component, the method comprising the steps of:
receiving, in the at least one electronic control unit, input signals from control elements in or on the vehicle for the acceleration and braking system and from position sensors on the at least two separate acceleration and braking system motors and on the at least two steering system motors;
evaluating input control signals by each the three CPUs, generating by each of the three CPUs generated control signals for the at least two separate acceleration and braking system motors and the at least two steering system motors on the basis of the input control signals and sensor signals of the motors;
each of the three CPUs forwarding the generated control signals to each other of the three CPUs and comparing the generated control signals received by the each other of the three CPUs with the generated control signals of the each of the three CPUs to generate CPU compare results; and
the logic component processing the generated control signals and the CPU compare results of the three CPUs to one another and, depending on the logic component programming, determining one of the three CPUs to be most trustworthy and forwarding the generated control signals of the one of the three CPUs determined to be most trustworthy to the at least two separate acceleration and braking system motors and the at least two steering system motors thereby ensuring secured control of the acceleration and braking system and the steering system.

9. The method according to claim 8, wherein the logic component forwards the generated control signals of the one of the three CPUs because the logic component has determined that the one of the three CPUs, in the comparison of the generated control signals by the one of the CPUs with the control signals generated by the other of the three CPUs is most trustworthy.

* * * * *